United States Patent
Pan et al.

(10) Patent No.: US 7,336,615 B1
(45) Date of Patent: Feb. 26, 2008

(54) DETECTING DATA PLANE LIVELINES IN CONNECTIONS SUCH AS LABEL-SWITCHED PATHS

(75) Inventors: Ping Pan, Emerson, NJ (US); Nischal Sheth, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1091 days.

(21) Appl. No.: 10/179,927

(22) Filed: Jun. 25, 2002

Related U.S. Application Data

(60) Provisional application No. 60/301,050, filed on Jun. 25, 2001.

(51) Int. Cl.
*H04L 12/26* (2006.01)
(52) U.S. Cl. ...................... 370/248; 370/225
(58) Field of Classification Search ........ 370/216–228, 370/241–253, 395.3, 401, 229–240
See application file for complete search history.

(56) References Cited

U.S. PATENT DOCUMENTS

| | | | |
|---|---|---|---|
| 6,775,239 B1* | 8/2004 | Akita et al. ................. | 370/248 |
| 6,895,441 B1* | 5/2005 | Shabtay et al. ............. | 709/238 |
| 2002/0054405 A1* | 5/2002 | Guo et al. ................... | 359/118 |
| 2005/0281192 A1* | 12/2005 | Nadeau et al. ............. | 370/217 |
| 2006/0013142 A1* | 1/2006 | Hongal et al. ............. | 370/248 |

* cited by examiner

*Primary Examiner*—Doris H. To
*Assistant Examiner*—Feben Micael Haile
(74) *Attorney, Agent, or Firm*—Straub and Pokotylo; John C. Pokotylo

(57) ABSTRACT

Testing the liveliness of a data plane of a label switched path (LSP) using a two stage approach. The first stage may use a general echo request operation that may be implemented using hardware. Therefore, the first stage does not heavily burden the control plane of the LSR. If a suspect LSP passes the first stage of the diagnostic operation, nothing more needs to be done. If, however, the suspect LSP fails the first stage, the diagnostic operation proceeds to a second stage. The second stage of the diagnostic operation sends probing massages through the suspect LSP, but uses the control plane to deliver the acknowledging messages. If the suspect LSP fails the second stage of the diagnostic operation, the ingress LSR can infer that the LSP is down, and begin recovery actions. The probing messages may include padding so that MTU limits can be tested. In addition, the probing messages may be encapsulated in a protocol that allows flow control, thereby protecting an LSR that can receive such messages from DoS attacks.

47 Claims, 11 Drawing Sheets

DETECTING DATA PLANE LIVELINES IN CONNECTIONS SUCH AS LABEL-SWITCHED PATHS

§ 0. RELATED APPLICATIONS

Benefit is claimed, under 35 U.S.C. § 119(e)(1), to the filing date of provisional patent application Ser. No. 60/301,050, entitled "DETECTING DATA PLANE LIVELINESS IN RSVP-TE", filed on Jun. 25, 2001 and listing Ping Pan and Nischal Sheth as the inventors, for any inventions disclosed in the manner provided by 35 U.S.C. § 112, ¶ 1. This provisional application is expressly incorporated herein by reference. However, the invention is not intended to be limited by any statements in that provisional application. Rather, that provisional application should be considered to describe exemplary embodiments of the invention.

§ 1. BACKGROUND OF THE INVENTION

§ 1.1 Field of the Invention

The present invention concerns detecting and diagnosing errors in connections, such as label-switched paths, that prevent user traffic from being delivered.

§ 1.2 Description of Related Art

The description of art in this section is not, and should not be interpreted to be, an admission that such art is prior art to the present invention. Although one skilled in the art will be familiar with networking, circuit switching, packet switching, label switched paths, and protocols such as RSVP and LDP, each is briefly introduced below for the convenience of the less skilled reader. More specifically, circuit switched and packet switched networks are introduced in § 1.2.1. The need for label switched paths, their operation, and their establishment are introduced in §§ 1.2.2-1.2.4 below. Finally, "failures" in a label switched path, as well as typical failure responses, are introduced in § 1.2.5 below.

§ 1.2.1 Circuit Switched Networks and Packet Switched Networks

Circuit switched networks establish a connection between hosts (parties to a communication) for the duration of their communication ("call"). The public switched telephone network ("PSTN") is an example of a circuit switched network, where parties to a call are provided with a connection for the duration of the call. Unfortunately, many communications applications, circuit switched networks use network resources inefficiently. Consider for example, the communications of short, infrequent "bursts" of data between hosts. Providing a connection for the duration of a call between such hosts simply wastes communications resources when no data is being transferred. The desire to avoid such inefficiencies has lead to the development of packet switched networks.

Packet switched networks forward addressed data (referred to as "packets" in the specification below without loss of generality), typically on a best efforts basis, from a source to a destination. Many large packet switched networks are made up of interconnected nodes (referred to as "routers" in the specification below without loss of generality). The routers may be geographically distributed throughout a region and connected by links (e.g., optical fiber, copper cable, wireless transmission channels, etc.). In such a network, each router typically interfaces with (e.g., terminates) multiple links.

Packets traverse the network by being forwarded from router to router until they reach their destinations (as typically specified by so-called layer-3 addresses in the packet headers). Unlike switches, which establish a connection for the duration of a "call" or "session" to send data received on a given input port out on a given output port, routers determine the destination addresses of received packets and, based on these destination addresses, determine, in each case, the appropriate link on which to send them. Routers may use protocols to discover the topology of the network, and algorithms to determined the most efficient ways to forward packets towards a particular destination address(es). Since the network topology can change, packets destined for the same address may be routed differently. Such packets can even arrive out of sequence.

§ 1.2.2 The Need for Label Switched Paths

In some cases, it may be considered desirable to establish a fixed path through at least a part of a packet switched network for at least some packets. More specifically, merely using known routing protocols (e.g., shortest path algorithms) to determine paths is becoming unacceptable in light of the ever-increasing volume of Internet traffic and the mission-critical nature of some Internet applications. Such known routing protocols can actually contribute to network congestion if they do not account for bandwidth availability and traffic characteristics when constructing routing (and forwarding) tables.

Traffic engineering permits network administrators to map traffic flows onto an existing physical topology. In this way, network administrators can move traffic flows away from congested shortest paths to a less congested path. Alternatively, paths can be determined autonomously, even on demand. Label-switching can be used to establish a fixed path from a head-end node (e.g., an ingress router) to a tail-end node (e.g., an egress router). The fixed path may be determined using known protocols such as RSVP or LDP. Once a path is determined, each router in the path may be configured (manually, or via some signaling mechanism) to forward packets to a peer (e.g., a "downstream" or "upstream" neighbor) router in the path. Routers in the path determine that a given set of packets (e.g., a flow) are to be sent over the fixed path (as opposed to being routed individually) based on unique labels added to the packets.

§ 1.2.3 Operations of Label Switched Paths

In one exemplary embodiment, the virtual link generated is a label-switched path ("LSP"). More specifically, recognizing that the operation of forwarding a packet, based on address information, to a next hop can be thought of as two steps-partitioning the entire set of possible packets into a set of forwarding equivalence classes ("FECs"), and mapping each FEC to a next hop. As far as the forwarding decision is concerned, different packets which get mapped to the same FEC are indistinguishable. In one technique concerning label switched paths, dubbed "multiprotocol label switching" (or "MPLS"), a particular packet is assigned to a particular FEC just once, as the packet enters the label-switched domain (part of the) network. The FEC to which the packet is assigned is encoded as a label, typically a short, fixed length value. Thus, at subsequent nodes, no further header analysis need be done—all subsequent forwarding over the label-switched domain is driven by the labels. Such FECs may be generalized such that particular ports, wavelengths, time slots, channels, etc. are used instead of labels.

FIG. 1 illustrates a label-switched path 110 across a network. Notice that label-switched paths 110 are simplex—traffic flows in one direction from a head-end label-switching router (or "LSR") 120 at an ingress edge to a tail-end label-switching router 130 at an egress edge. Generally, duplex traffic requires two label-switched paths—one for each direction. However, some protocols support bi-directional label-switched paths. Notice that a label-switched path 110 is defined by the concatenation of one or more label-switched hops, allowing a packet to be forwarded from one label-switching router (LSR) to another across the MPLS domain 110.

Recall that a label may be a short, fixed-length value carried in the packet's header to identify a forwarding equivalence class (or "FEC"). Recall further that a FEC is a set of packets that are forwarded over the same path through a network, sometimes even if their ultimate destinations are different. At the ingress edge of the network, each packet is assigned an initial label (e.g., based on all or a part of its layer 3 destination address). More specifically, referring to the example illustrated in FIG. 2, an ingress label-switching router 210 interprets the destination address 220 of an unlabeled packet, performs a longest-match routing table lookup, maps the packet to an FEC, assigns a label 230 to the packet and forwards it to the next hop in the label-switched path.

In the MPLS domain, the label-switching routers (LSRs) 220 ignore the packet's network layer header and simply forward the packet using label-swapping. More specifically, when a labeled packet arrives at a label-switching router (LSR), the input port number and the label are used as lookup keys into an MPLS forwarding table. When a match is found, the forwarding component retrieves the associated outgoing label, the outgoing interface (or port), and the next hop address from the forwarding table. The incoming label is replaced with the outgoing label and the packet is directed to the outgoing interface for transmission to the next hop in the label-switched path. FIG. 2 illustrates such label-switching by label-switching routers (LSRs) 220a and 220b.

When the labeled packet arrives at the egress label-switching router, if the next hop is not a label-switching router, the egress label-switching router discards ("pops") the label and forwards the packet using conventional (e.g., longest-match IP) forwarding. FIG. 2 illustrates such label popping and IP forwarding by egress label-switching router 240.

§ 1.2.4 Establishing Label Switched Paths

In the example illustrated with reference to FIG. 2, each label-switching router had appropriate forwarding labels. However, these labels must be provided to the label-switching routers in some way.

There are two basic types of LSPs—static LSPs and protocol (e.g., LDP, RSVP, BGP) signaled LSPs. Although each type of LSP is known to those skilled in the art, each is introduced below for the reader's convenience.

With static LSPs, labels are manually assigned on all routers involved in the path. No signaling operations by the nodes are needed.

With LDP signaled LSPs, routers establish label-switched paths (LSPs) through a network by mapping network-layer routing information directly to data link layer switched paths. LDP operates in a hop-by-hop fashion as opposed to RSVP's end-to-end fashion. More specifically, LDP associates a set of destinations (route prefixes and router addresses) with each data link LSP. This set of destinations is called the Forwarding Equivalence Class ("FEC"). These destinations all share a common data link layer-switched path egress and a common unicast routing path. Each router chooses the label advertised by the next hop for the FEC and splices it to the label it advertises to all other routers. This forms a tree of LSPs that converge on the egress router.

With RSVP signaled LSPs, an ingress (i.e., head-end) router is configured. The head-end router uses (e.g., explicit path and/or path constraint) configuration information to determine the path. The egress (i.e., tail-end) and intermediate routers accept signaling information from the ingress (i.e., head-end) router. RSVP signaled LSPs maintain "soft-state" connections; meaning an RSVP signaled LSP is refreshed periodically or it is torn down. Therefore, the routers of the LSP set up and maintain the LSP cooperatively through the use of path signaling messages such as PATH messages and RESV messages.

PATH messages are sent from the ingress router to the egress router and follow the path of the LSP. RESV messages originate from the egress router, and is delivered hop-by-hop back towards the ingress router. As a PATH message travels the path of an LSP, it takes the IP address of the router it was transmitted from and stores it in the router to which it is sent. This "IP trail" left by the PATH message is used by RESV messages to return back through the LSP path. Any errors encountered when establishing and maintaining an LSP are reported back to the ingress (i.e., head-end) router.

An LSP may be considered to have two planes, a control plane and a data plane. In an RSVP signaled LSP, the PATH and RESV messages that are used to set up and maintain the LSP are transmitted on the control plane using IP addresses, and user traffic is transmitted on the data plane using labels.

§ 1.2.5 "Failures" in a Label Switched Path

In various situations the forwarding information 220 of the forwarding component 210 of intermediate label-switching routers (LSRs) may become corrupted, e.g., OUT label 230 is stored as "3" instead of "5". In this situation, data leaving LSR 210 will be "black-holed". That is, when LSR 220a receives the packet with an IN label of "3" it will either discard it or transmit the packet along an LSP other than the desired LSP.

Since the control plane uses IP addresses to route its messages, the control plane is still active and does not recognize the error. Therefore, the ingress LSR may continue to transmit data through the broken LSP.

If an ingress LSR continuously fails to deliver data through a given LSP, that LSP may be suspected of being down. It is desirable to provide a tool that would detect, within a reasonable amount of time, if a suspected LSP is actually down. In the art, there is no practical and quick solution known to detect the liveliness of the data plane of an LSP. Presently, if an LSP is suspected of being down, users perform manual memory dumps along several LSPs, examining the labeling information of the control plane and the data plane of the LSPs, to discover which LSP was broken. This procedure can be very time consuming and may not be a practical solution because of the length of time needed to locate the problem.

§ 2. Summary of the Invention

The present invention discloses apparatus, data structures and methods for testing the liveliness of a data plane of a label switched path (LSP). A two stage approach is used to minimize the processing overhead imposed on an LSR control plane. The first stage uses a general echo request operation that may be implemented using hardware. Therefore, the first stage does not heavily burden the control plane of the LSR. If a suspect LSP passes the first stage of the diagnostic operation, nothing more need be done. If, however, the suspect LSP fails the first stage, the diagnostic operation proceeds to a second stage.

The second stage of the diagnostic operation sends probing messages through the suspect LSP, but uses the control plane (or alternatively, the data plane, such as another LSP)

to deliver the acknowledging messages. If the suspect LSP fails the second stage of the diagnostic operation, the ingress LSR can infer that the LSP is down, and begin recovery actions.

The present invention can also be used to test MTU limits. In addition, the LSP_ping message of the present invention is encapsulated in a protocol that allows flow control, thereby protecting an LSR that can receive LSP_ping messages from DoS attacks.

§ 3. BRIEF DESCRIPTION OF THE DRAWINGS

§ 4. DETAILED DESCRIPTION

The present invention involves methods, apparatus and data structures for testing the liveliness of label switched paths. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus and data structures and any other patentable subject matter.

In the following, exemplary environments in which the present invention may operate are described in § 4.1. Then high-level functions that may be performed by the present invention are introduced in § 4.2. In § 4.3, exemplary operations that may be used to effect those high-level functions are described. Thereafter, exemplary apparatus, methods and data structures that may be used are described in § 4.4. Examples illustrating operations preformed by exemplary embodiments of the invention are then provided in § 4.5. Finally, some conclusions regarding the present invention are set forth in § 4.6.

§ 4.1 ENVIRONMENT IN WHICH THE PRESENT INVENTION MAY OPERATE

The present invention may be used in communication systems including nodes for forwarding addressed data, such as packets, and having a control component and a forwarding component. The present invention may be initiated by the control component of the ingress node of a label switched path. The node may be a router that supports label-switched paths.

Figure 4:
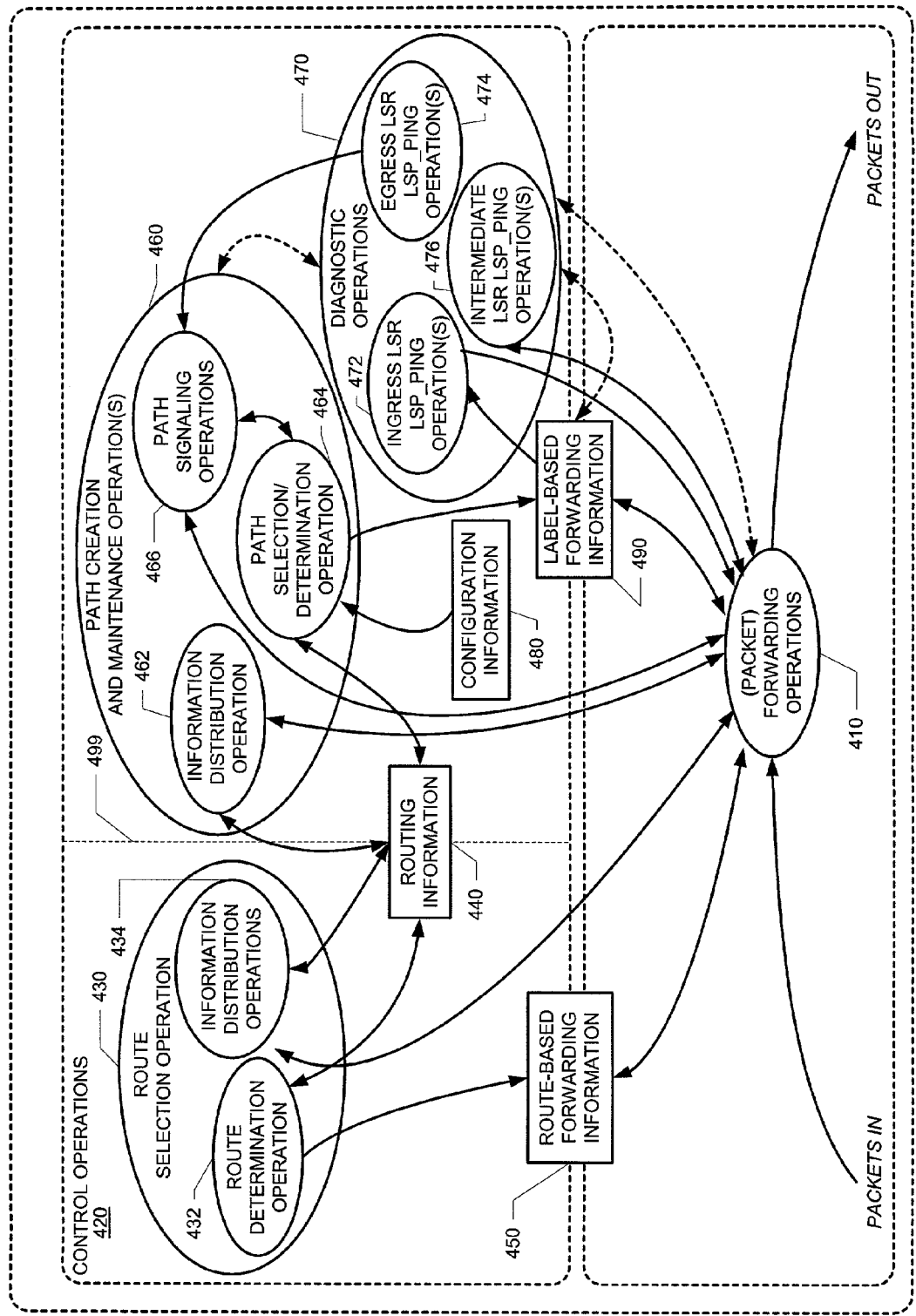
FIG. 4 is a bubble chart of a router in which the present invention may be used.

FIG. 4 is a bubble-chart of an exemplary router 400 in which the present invention may be used. The router 400 may include a packet forwarding operation 410 (part of a "data plane") and a control (e.g., routing) operation 420 (part of a "control plane"). The packet forwarding operation 410 may forward received packets based on route-based forwarding information 450 and/or based on label-based forwarding information 490, such as label-switched path information.

Regarding the control operations 420, the operations and information depicted to the right of dashed line 499 are related to creating and maintaining virtual links, such as label-switched paths, while the operations and information depicted to the left of the dashed line 499 are related to creating routes. These operations and information needn't be performed and provided, respectively, on all routers of a network.

The route selection operations 430 include information distribution operations 434 and route determination operations 432. The information distribution operations 434 may be used to discover network topology information, store it as routing information 440, and distribute such information. The route determination operation 432 may use the routing information 440 to generate route-based forwarding information 450.

The path creation and maintenance operation(s) 460 may include an information distribution operation 462, a path selection/determination operation 464, and path signaling operations 466. The information distribution operation 462 may be used to obtain information about the network, store such information as path information (not shown), and distribute such information. The path determination/selection operation 464 may use the routing information 440, the path information and/or configuration information 480 to generate label-based forwarding information 490, such as label-switched paths for example. Path signaling operations 466 may be used to accept and disseminate signal label-based forwarding information (e.g., PATH and RESV messages).

The exemplary router 400 may also include diagnostic operations 470. The diagnostic operations 470 may include ingress LSR LSP_ping operation(s) 472, egress LSR LSP_ping operation(s) 474, and intermediate LSR LSP_ping operation(s) 476. The ingress LSR LSP_ping operation(s) 472 uses label-based forwarding information 490 to test suspect LSPs, if the router 400 is the ingress router of the suspect LSP. The egress LSR LSP_ping operation(s) 474 uses label-based forwarding information 490 and may also use path signaling operations 466 to respond to requests from ingress LSRs. The intermediate LSR LSP_ping operation 476 uses label-based forwarding information 490 to forward LSP_ping request or replies. Further interactions between these operations as it pertains to the present invention will be described below.

§ 4.2 HIGH-LEVEL FUNCTIONS THAT MAY BE PERFORMED BY THE PRESENT INVENTION

One high-level function of the present invention may be to test the liveliness of the data plane of an LSP in a reasonable amount of time, while minimizing processing burdens to the control plane of the LSP. This LSP test may be used when the failure of an LSP to deliver user traffic is not detected by the control plane. For instance when the forwarding labels in the data plane of an LSR become corrupted.

To provide a relatively quick test without adding extra burdens to the control plane of an LSP, the present invention may use a multistage diagnostic approach. Before effecting the diagnostic operation, it should be determined if both ingress and egress LSRs support the diagnostic operation, though such a check is not necessary.

The first stage of the diagnostic operation implements a general echo operation that may be, and in some embodiments is, performed at the hardware level of a router. Therefore, in routers employing a hardware-intensive forwarding component (data plane) and a software-intensive control component (control plane), the first stage of the diagnostic operation has little impact on the performance of the LSP's control plane. The ingress LSR periodically sends a general echo request through the suspect LSP towards an egress LSR. When the egress LSR receives the general echo request, it generates a general echo reply, and sends the reply to the sourcing LSR using conventional methods (e.g., it may use another LSP, or a routed path). If the ingress LSR receives the general echo reply, it can infer that the suspect LSP is alive, and nothing more is done. If, on the other hand, the ingress LSR does not receive a general echo reply in a predetermined amount of time, the ingress LSR can infer that an error occurred, either in the LSP, the reverse path, or both. To diagnose the source of the error, the diagnostic operation proceeds to a second stage.

The second stage of the diagnostic operation also transmits data through the LSP to test it, but it uses the control plane (or alternatively (e.g., another LSP of) the data plane) to send acknowledgement messages back to the sourcing LSR. The control plane has operations to detect when an error occurs in the control plane of an LSP. If an error in the control plane of an LSP occurs, the ingress LSR will know about the error through the occurrence of error messages and/or the absence of expected messages. If these error messages are not received and/or the expected messages are received, it may be inferred that the control plane of the LSP is alive. Since it is known that the control plane of the LSP is alive, it may be used as a return path when testing the liveliness of the data plane of the LSP. As stated above, alternatively (another LSP of) the data plane may be used as a return path for second stage acknowledgement messages.

The second stage of the diagnostic operation proceeds by sending a probing packet through the data plane of the suspect LSP. Once the egress LSR receives the probing packet, it returns an acknowledgement back to the sourcing ingress LSR through the control plane (or alternatively, via (another LSP of) the regular data forwarding plane). If an acknowledgment is received within a predetermined amount of time, the ingress LSR can infer that the suspect LSP is alive. If the ingress LSR does not receive an acknowledgement, then the ingress LSR may infer that the suspect LSP is down, and recovery actions are started. These recovery actions may include informing a network operator of the problem and/or rerouting user traffic to a back-up LSP.

The present invention is not limited to occasions when an LSP fails to deliver user traffic. Another high-level function that may be served by the probing packet is to test if the LSP can handle an advertised maximum transmission unit (MTU). The probing packet of the second stage of the diagnostic operation may be padded with extra bits to conform to the advertised MTU. If the ingress LSR receives an acknowledgment from the egress LSR, then the probing packet was not dropped along the LSP, and the LSP can of deliver packets the size of the advertised MTU.

In addition, to protect against Denial of Service (DoS) attacks, the probing packet (e.g., the LSP_ping message) should be encapsulated in a protocol that offers flow control mechanisms. This limits the damage that may be caused if an LSR is flooded with probing packets, which is typical in a DoS attack.

§ 4.3 EXEMPLARY OPERATIONS

Figure 5A:
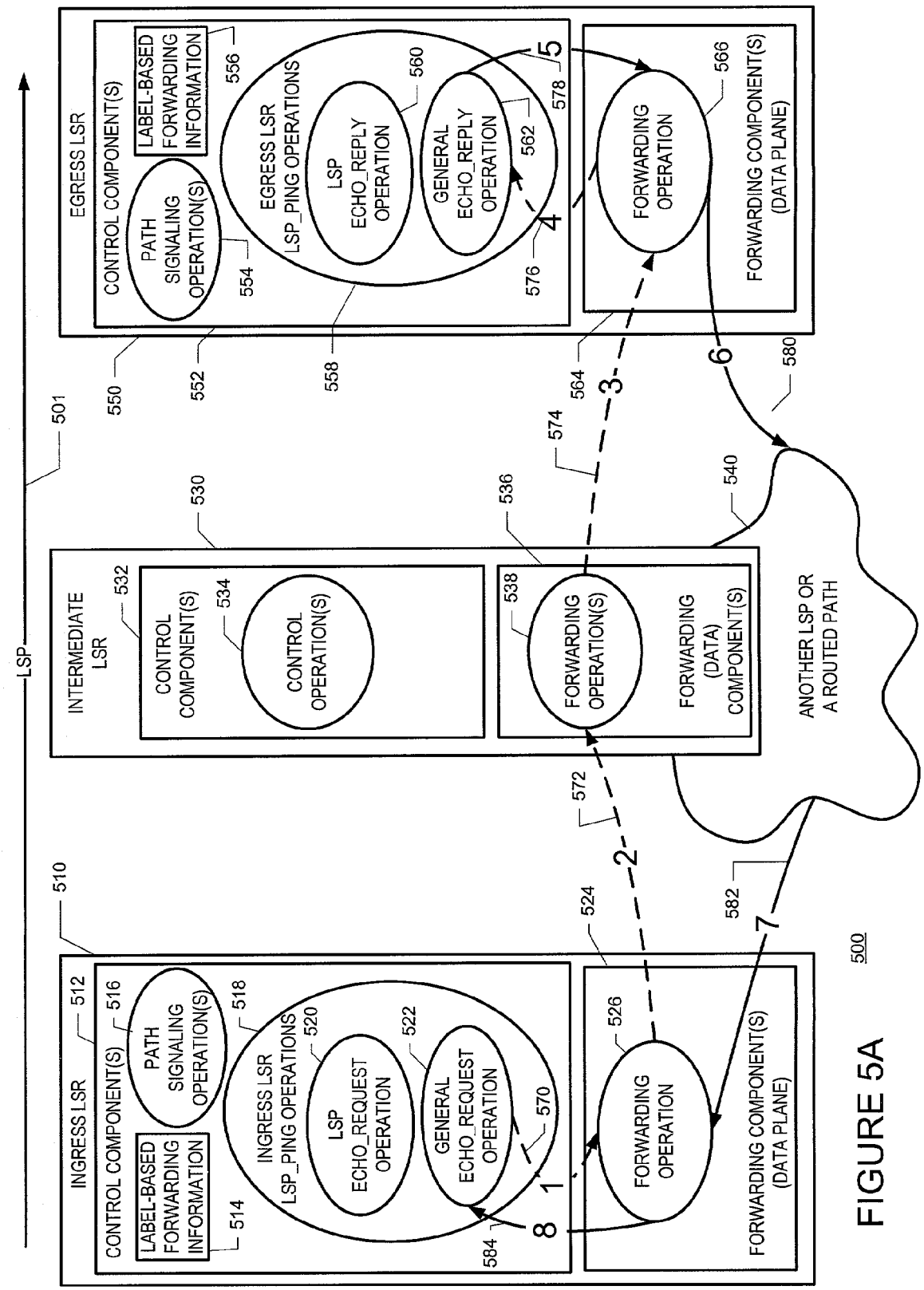
FIG. 5A is a message diagram illustrating an example of operations of a general echo stage of the invention.
Figure 5B:
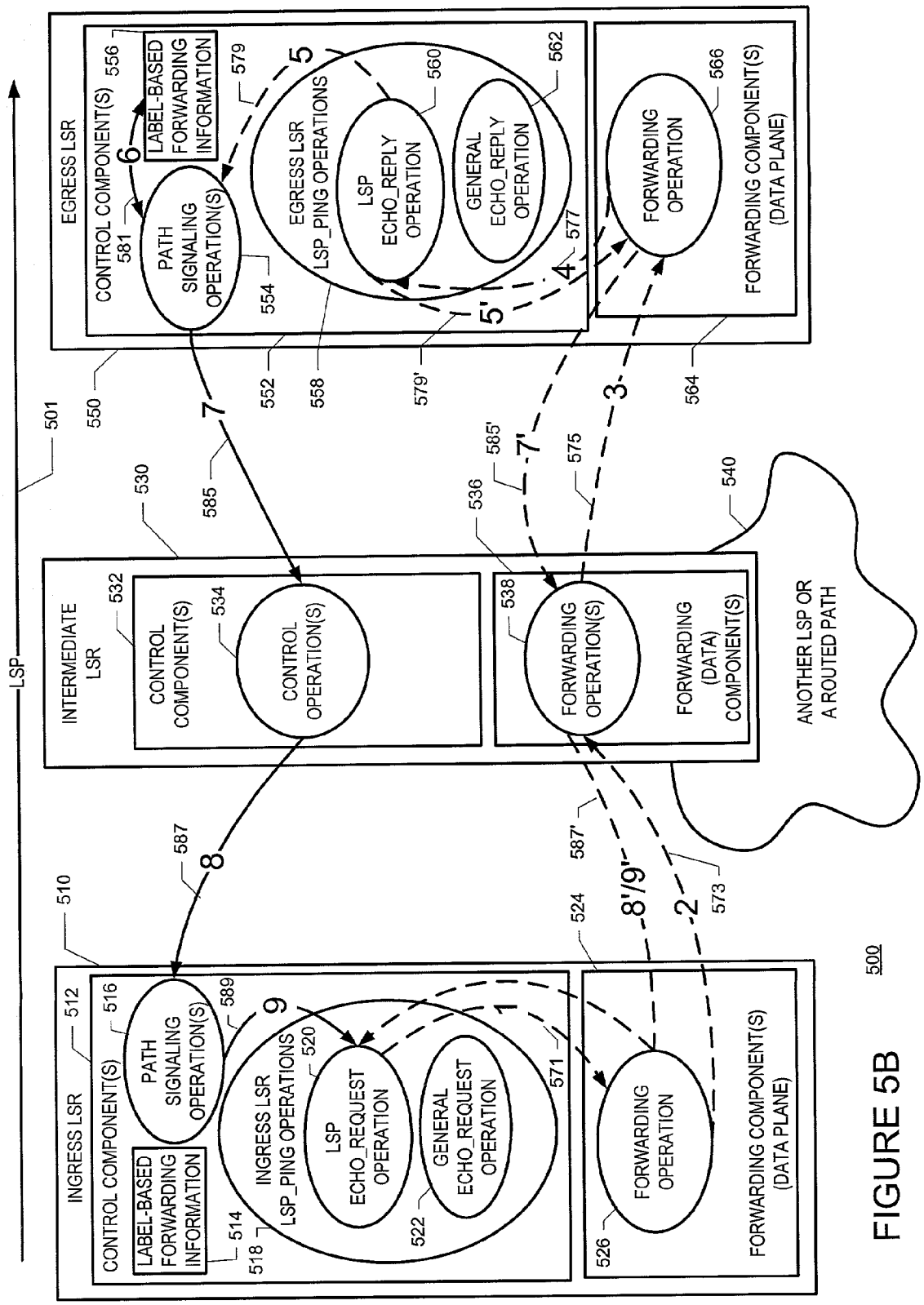
FIG. 5B is a message diagram illustrating an example of operations of an LSP echo stage of the invention.

FIG. 5A is a messaging diagram illustrating the first stage in an exemplary implementation of the diagnostic operation of the present invention. FIG. 5B is a messaging diagram illustrating the second stage in an exemplary implementation of the diagnostic operation of the present invention. The discussion of the diagnostic operation will begin with a description of communication system 500 and the steps of the first stage in § 4.3.1. Then the steps of the second stage are discussed in § 4.3.2. In § 4.3.3 using flow control to protect against DoS attacks is discussed.

§ 4.3.1 Communications System Description and Stage One Operations

In communications system 500, an LSP 501 is defined to pass through an ingress LSR 510, one (or more) intermediate LSR 530, and an egress LSR 550. The communications system 500 may include other network components, represented as a cloud 540, that may or may not be part of the LSP 501.

LSR 510 is an exemplary implementation of exemplary router 400 and defines the ingress of LSP 501. Ingress LSR 510 includes control component(s) 512 and forwarding component(s) 524.

Control component(s) 512 includes label-based forwarding information 514, a path signaling operation(s) 516, and an ingress LSR LSP_ping operation(s) 518. The label-based forwarding information 514 and the path signaling operation(s) 516 both serve the same or similar functions as the label-based forwarding information 490 and the path signaling operation(s) 466 of exemplary router 400.

Ingress LSR LSP_ping operation 518 includes an LSP echo_request operation 520 and a general echo_request operation 522. General echo_request operation 522 implements part of the first stage of the diagnostic operation of the present invention. LSP echo_request operation 520 implements part of the second stage of the diagnostic operation of the present invention. These operations will be discussed in more detail below.

The forwarding component 524 includes a forwarding operation(s) 526, which performs the same or similar functions as forwarding operations 410 of exemplary router 400.

The intermediate LSR 530 includes a control component(s) 532, and a forwarding component(s) 536. The control component(s) 532 includes a control operation(s) 534, which forwards path signaling messages through LSP 501. The forwarding component(s) 536 includes a forwarding operation(s) 538, which forwards user traffic on the data plane of LSP 501. The exemplary communications network 500 shows one intermediate LSP 530. However, the present invention may be used with LSPs that include a plurality of intermediate LSRs, or alternatively, no intermediate LSRs.

LSR 550 is an exemplary implementation of exemplary router 400 and defines the egress of LSP 501. Egress LSR 550 includes control component(s) 552 and forwarding component(s) 564.

Control component(s) 552 includes label-based forwarding information 556, a path signaling operation(s) 554, and egress LSR LSP_ping operations 558. The label-based forwarding information 556 and the path signaling operation 554 both serve the same or similar functions as the label-based forwarding information 490 and the path signaling operation 466 of exemplary router 400.

The egress LSR LSP_ping operations 558 includes an LSP echo_reply operation 560 and a general echo_reply operation 562. The general echo_reply operation 560 implements part of the first stage of the diagnostic operation of the present invention. The LSP echo_reply operation 562 implements part of the second stage of the diagnostic operation of the present invention. These operations will be discussed in more detail below.

The forwarding component(s) 564 includes a forwarding operation(s) 566, which performs the same or similar functions as the forwarding operations 410 of exemplary router 400.

The control component(s) 512, 532, 552 of the three LSRs 510, 530, 550 may be referred to as defining a control plane of LSP 501. The forwarding component 524, 536, 564 of the three LSRs 510, 530, 550 may be referred to as defining a data plane of LSP 501.

The first stage of an exemplary diagnosis operation 470 will now be discussed, with reference to FIG. 5A. Dashed arrows represent information traveling downstream towards the egress LSR 550, and solid arrows represent information traveling upstream towards the ingress LSR 510.

Before initiating the diagnostic operation, it is established that both the ingress and the egress LSRs support the diagnostic operation.

The first stage of diagnosis operation 470 begins at ingress LSR 510. The ingress LSR LSP_ping operations 518 initiates the general echo_request operation 522. Dashed arrow 570 represents a first communication ("1") transmitted by the general echo_request operation 522. A general echo request message, which includes a test message and an identifier, is generated and passed to the forwarding operation 526 for transmission through LSP 501. The identifier is used by the ingress LSR to distinguish between multiple LSPs, and may be used as the test message.

The general echo request may, and in some embodiments does, use Internet Control Message Protocol (ICMP). In such embodiments, the general echo request message includes a source IP address, a destination IP address, a test message, and message-type field. When the destination node receives the echo request, it can simply switch the source and destination IP addresses, change the message-type field to label the packet as an echo reply message, and transmit the packet upstream to the sourcing LSR. This uses very little processing resources and in some embodiments, this echo reply operation is built into the hardware of an LSR.

Next, dashed arrow 572 ("2") represents the general echo request message being transmitted to the intermediate LSR 530. The forwarding operation(s) 538 of the intermediate LSR 530 may then forward the general echo request message along LSP 501 in a conventional manner.

Dashed arrow 574 ("3") represents the general echo request message arriving at egress LSR 550. Dashed arrow 576 ("4") represents the forwarding operation 566 sending the general echo request message to the general echo_reply operation 562.

The general echo_reply operation 562 may process the general echo request message (e.g., ICMP echo request) as general echo requests are conventionally processed. In an ICMP embodiment, an echo reply is generated by switching the source and destination IP addresses and changing the message-type field of the packet to identify the packet as an ICMP echo reply message.

Solid arrow 578 ("5") represents the generated general echo reply message being sent to the forwarding operation 566 for transmission back to the node that sourced the echo request message. Solid arrow 580 ("6") represents the forwarding operation 566 transmitting the general echo reply message through another LSP, or via a routed path through network nodes/components 540. Solid arrow 582 ("7") represents the general echo reply message arriving at the ingress LSR 510. Solid arrow 584 ("8") represents the forwarding operation 526 passing the general echo reply message to the general echo_request operation 522.

The test message and identifier of the general echo reply message are inspected, and if they match what was sent in the general echo request message, it may be inferred that LSP 501 is alive. If the LSP 501 is considered to be alive, the second stage of the diagnostic operation does not have to be performed.

During an execution of the first stage of the diagnostic operation, general echo request operation 522 may periodically transmit general echo request messages. If ingress LSR 510 does not receive general echo reply messages from egress LSR 550 for a predetermined (e.g., long) period of time, there may be a failure in the LSP, in the return path, or both. The diagnostic operation then proceeds to its second stage to determine if the failure occurred in LSP 501.

§ 4.3.2 Stage Two Operations

Now the second stage of an exemplary diagnosis operation 470 will be discussed, with reference to FIG. 5B. Dashed arrows represent information traveling downstream towards the egress LSR 550, and solid arrows represent information traveling upstream towards the ingress LSR 510. At this point of the diagnostic operation, the first stage of the diagnostic operation has indicated a failure, but it is not known with certainty whether the failure is due to a failure of the LSP 501.

If there were failures in the control plane of an LSP, then the protocol that refreshes the LSP, e.g., RSVP, would detect the failure. Therefore, in this example, it may be assumed that the control plane of LSP 501 is still operational, though this cannot be said for the data (forwarding) plane of the LSP 501. Although the foregoing assumes that the LSP is a soft-state LSP, the present invention can be used with non-soft-state LSPs.

Since the control plane is still alive, the second stage of the diagnosis operation uses this fact to test LSP 501. A test message (e.g., an LSP_ping message) is sent through the data plane of LSP 501 and the control plane of LSP 501 (or alternatively, the data plane (e.g., of another LSP)) is used to return an acknowledging message. Since it is known that the control plane is alive, if no reply is returned from egress LSR 550, it may be assumed that the LSP 501 is down.

FIG. 5B is a messaging diagram that illustrates exemplary second stage operations. Dashed arrow 571 ("1") represents the LSP echo_request operation 520 sending a generated LSP_ping message to forwarding operation 526 for transmission. An LSP_ping message basically includes an LSP identifier, an ingress LSR (or source) identifier, and an LSP probe process identifier (which may be included in an LSP_echo object). A message sequence number may also be provided. The fields of an exemplary, more complex, LSP_ping message 600 will be discussed later. The LSP identifier and the ingress LSR identifier are used by an egress LSR to locate the LSP in its label-based forwarding information so that the egress LSR can use its control component to send a reply back to the ingress LSR that sourced the LSR_ping message. The LSP probe process identifier (e.g., LSP_echo object) carried within the LSP_ping message is returned to the sourcing LSR by the egress LSR, and is used to verify that the LSP is alive. In addition, since it is possible for the ingress LSR to check multiple LSPs, each check possibly including multiple LSP_ping messages, the LSP probe process identifier (e.g., LSP_echo object) may also be used by the ingress LSR to distinguish between LSPs being checked, and LSP_ping messages Dashed arrow 573 ("2") represents the LSP_ping message sent by the forwarding operation(s) 526 through LSP 501 in a conventional manner. Dashed arrow 575 ("3") represents the LSP_ping message sent by the forwarding operation 538 of intermediate LSR 530 to egress LSR 550 in a conventional manner. Dashed arrow 577 ("4") represents the LSP_ping message being sent to the LSP echo_reply operation 560.

The LSP echo_reply operation 560 uses the LSP identifier and the ingress LSR identifier to locate LSP 501 in its label-based forwarding information 556. In one embodiment, the LSP echo_reply operation 560 then checks to see if the path signaling, e.g., RESV, refresh message for LSP 501 already includes an LSP probe process identifier (e.g., LSP_echo object). If not, echo_reply operation 560 adds or updates the LSP probe process identifier (e.g., LSP_echo object) into the path signaling, e.g., RESV, refresh message. This is represented by dashed arrow 579 ("5").

In an embodiment of the present invention to be used with soft-state LSPs, when it is time to refresh LSP 501, solid arrow 581 ("6") represents the path signaling operation(s) 554 accessing the label-based forwarding information 556 for the path signaling (e.g., RESV) refresh message for LSP 501. Solid arrow 585 ("7") represents the path signaling operation 554 forwarding the path signaling (e.g., RESV) refresh message including the LSP probe process identifier (e.g., LSP_echo object) to the intermediate LSR 530.

Solid arrow 587 ("8") represents the control operation(s) 534 of the intermediate LSR 530 forwarding the path signaling (e.g., RESV) refresh message to ingress LSR 510. (In FIG. 5B the reverse LSP path followed by the path signaling (e.g., RESV) refresh message is a high level depiction. Therefore, at each LSR, the control plane may send the path signaling (e.g., RESV) refresh message to its forwarding component to perform the physical action of the path signaling (e.g., RSEV) refresh message.)

Solid arrow 589 ("9") represents the path signaling operation 516 sending the LSP probe process identifier (e.g., LSP_echo object) to the LSP echo request operation 520. The LSP echo_request operation 520 compares the LSP probe process identifier (LSP_echo object) it received to the LSP probe process identifier (LSP_echo object) it transmitted, and if they are the same, it may infer that LSP 501 is alive. Since LSR 510 may be the ingress LSR to a plurality of LSPs, and LSR 510 may be diagnosing more than one LSP, a unique LSP probe process identifier (e.g., LSP_echo object) may be assigned to each suspect LSP so that LSR 510 may distinguish them. Further, if a given LSP echo request process generates multiple probing packets, sequence numbers may be used to distinguish such probing packets.

During an execution of the second stage of a diagnostic operation, LSP echo_request operation 520 will periodically transmit LSP_ping messages. If ingress LSR 510 does not receive an LSP probe process identifier (LSP_echo objects) from egress LSR 550 for a predetermined period of time, it may assume that there is a failure in LSP 501, and LSP 501 is declared as down. At this point, the ingress LSR 510 may try to fix and/or bypass the down LSP. This may include generating a message to network management, tearing-down and rebuilding the LSP, and/or rerouting user traffic to a backup LSP.

As indicated by alternative paths 5', 7' and 8'/9', the LSP echo_reply or acknowledge message may be sent from the egress node 550 to the ingress node 510 via the data plane (e.g. via another LSP) in an alternative embodiment of the invention.

A further alternative method for implementing the second stage of a diagnostic operation includes sending a test message downstream, using the control plane, e.g., in a PATH message. Once the test message is received by the egress LSR 550, it returns the test message to the sourcing ingress LSR 510 using the same upstream data path that was or would have been attempted in the first stage of the diagnostic operation. If the ingress LSR 510 receives the test message back from the egress LSR 550, it is determined that the return path is alive. Therefore, it may be inferred that the suspect LSP 501 caused the first stage of the diagnostic operation to fail, and suspect LSP 501 can therefore be determined to be down.

§ 4.3.3 Flow Control Considerations

When the LSP_ping messages are transmitted by the LSP echo request operation 520, each message should be encapsulated in a protocol that allows for flow control, e.g., User Datagram Protocol ("UDP"). UDP and other similar protocols use unique port numbers so that a router receiving such a message can identify the type of message it is receiving. This unique port number can be used by a rate limiter to regulate the amount of LSP_ping messages being sent to the control components of an egress LSR, thereby protecting the LSR in the event of a DoS attack.

§ 4.4 METHODS, DATA STRUCTURES, AND APPARATUS

Exemplary methods and data structures for effecting the functions summarized in § 4.2 and the operations described in § 4.3, are described in this section. More specifically, § 4.4.1.1 describes an exemplary diagnostic method, § 4.4.1.2 describes an exemplary ingress LSR LSP_ping method, § 4.4.1.3 describes an exemplary egress LSR LSP_ping method, § 4.4.1.4 describes an exemplary intermediate LSR LSP_ping method and § 4.4.2 describes an exemplary LSP_ping message. Then, exemplary apparatus that may be used to effect the functions summarized in § 4.2 are described in § 4.4.3. Finally, an example of operations described in § 4.3 is provided in § 4.5.

§ 4.4.1 Exemplary Methods

Exemplary methods for effecting the functions summarized in § 4.2 and the operations described in § 4.3, are described below.

§ 4.4.1.1 Diagnostic Method

Figure 7:
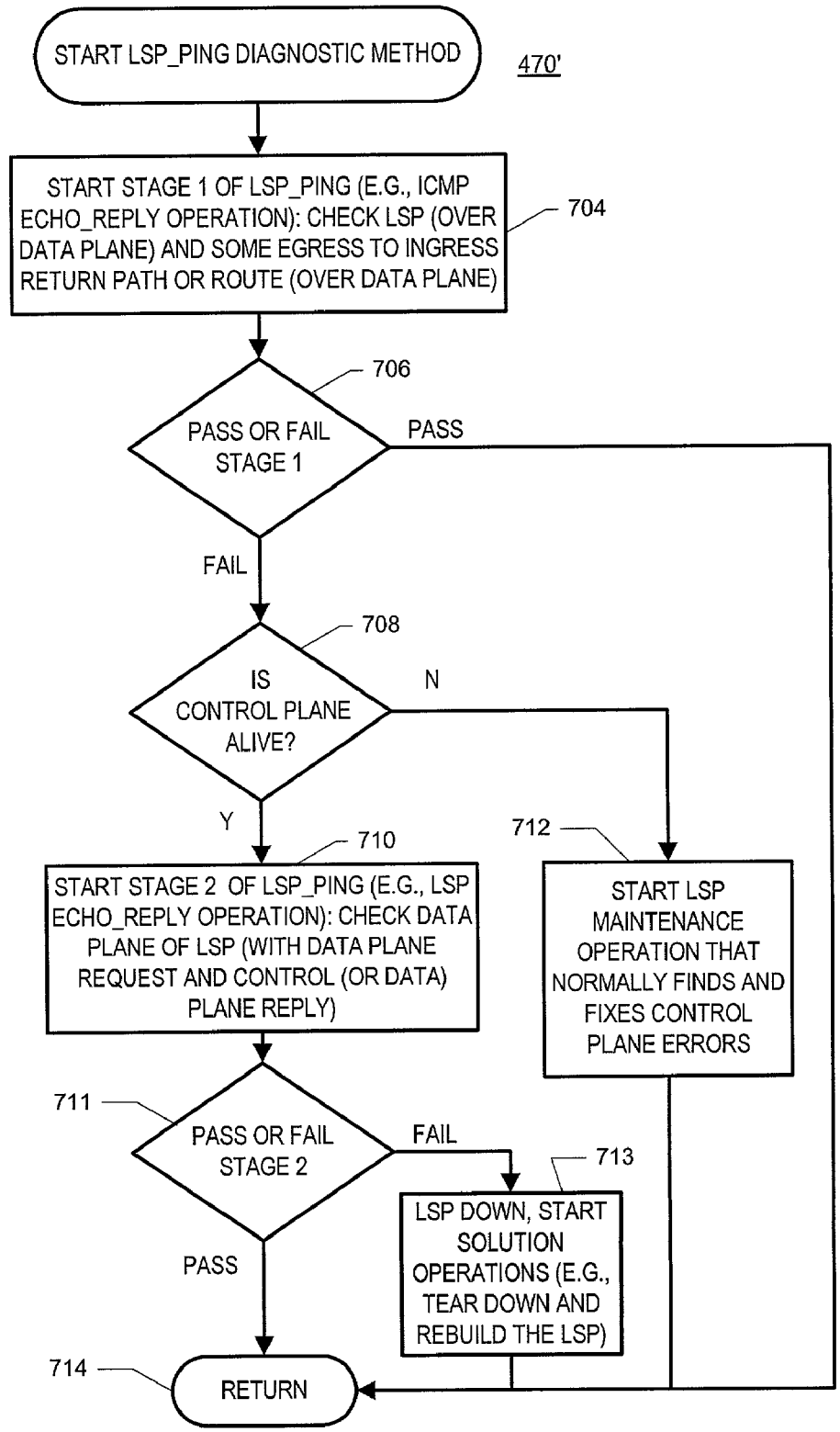
FIG. 7 is a flow diagram of an exemplary method for diagnosing a suspect LSP.

FIG. 7 is a high-level flow diagram of an exemplary method 470' for effecting various diagnostic operations 470. At block 704, an ingress LSR starts stage 1 operations of the diagnostic operation 470. Recall that stage 1 operations were discussed in § 4.3.1. The method 470' then proceeds to decision block, 706. If the suspect LSP passes stage 1 of the diagnostic operation, e.g., replies to ICMP echo requests are received from the egress router, the diagnostic method 470' is left via RETURN node 714. In this case, the LSP is alive and functioning. Returning to decision block 706, if the LSP fails stage 1 operations, e.g., ICMP echo requests are not answered, then the diagnostic method 470' proceeds to decision block 708.

At decision block 708, the control plane of the suspect LSP is checked to see if it is still alive. If the control plane is down, the diagnostic method 470' proceeds to block 712. As indicated by block 712, the control plane starts normal LSP maintenance operations that find and fix control plane errors, before the method 470' is left via RETURN node 714. Returning to decision block 708, if the control plane is alive, diagnostic method 470' proceeds to block 710.

As indicated by block 710, the ingress LSR starts stage 2 operations of the diagnostic operation 470. Recall that stage 2 operations were discussed in § 4.3.2.

Diagnostic method 470' proceeds to decision block 711. If the suspect LSP passes stage 2 of the diagnostic operation, e.g., LSP_ping request messages are answered by the egress router, the diagnostic method 470' is left via RETURN node 714. The LSP is alive and functioning, and the failure of stage 1 may have been located in the return path of the general echo reply message. Returning to decision block 711, if the LSP fails stage 2 operations, e.g., LSP_ping request messages are not answered (or such answers are not received, but other aspects of the LSP establishing and maintaining protocols seem normal), then the diagnostic method 470' proceeds to block 713.

As indicated by block 713, the control plane infers that the LSP is down and starts solution operations (e.g., it may tear down and rebuild the broken LSP, and/or reroute user traffic to a backup LSP) as a consequence. Then, diagnostic method 470' is left via RETURN node 714.

The foregoing describes an exemplary diagnostic method 470' as applied over an LSP. Exemplary methods that may be performed by ingress, egress and intermediate LSRs are now described in § 4.4.1.2 through § 4.4.1.4 below.

§ 4.4.1.2 Ingress LSR LSP_Ping Method

Figure 8:
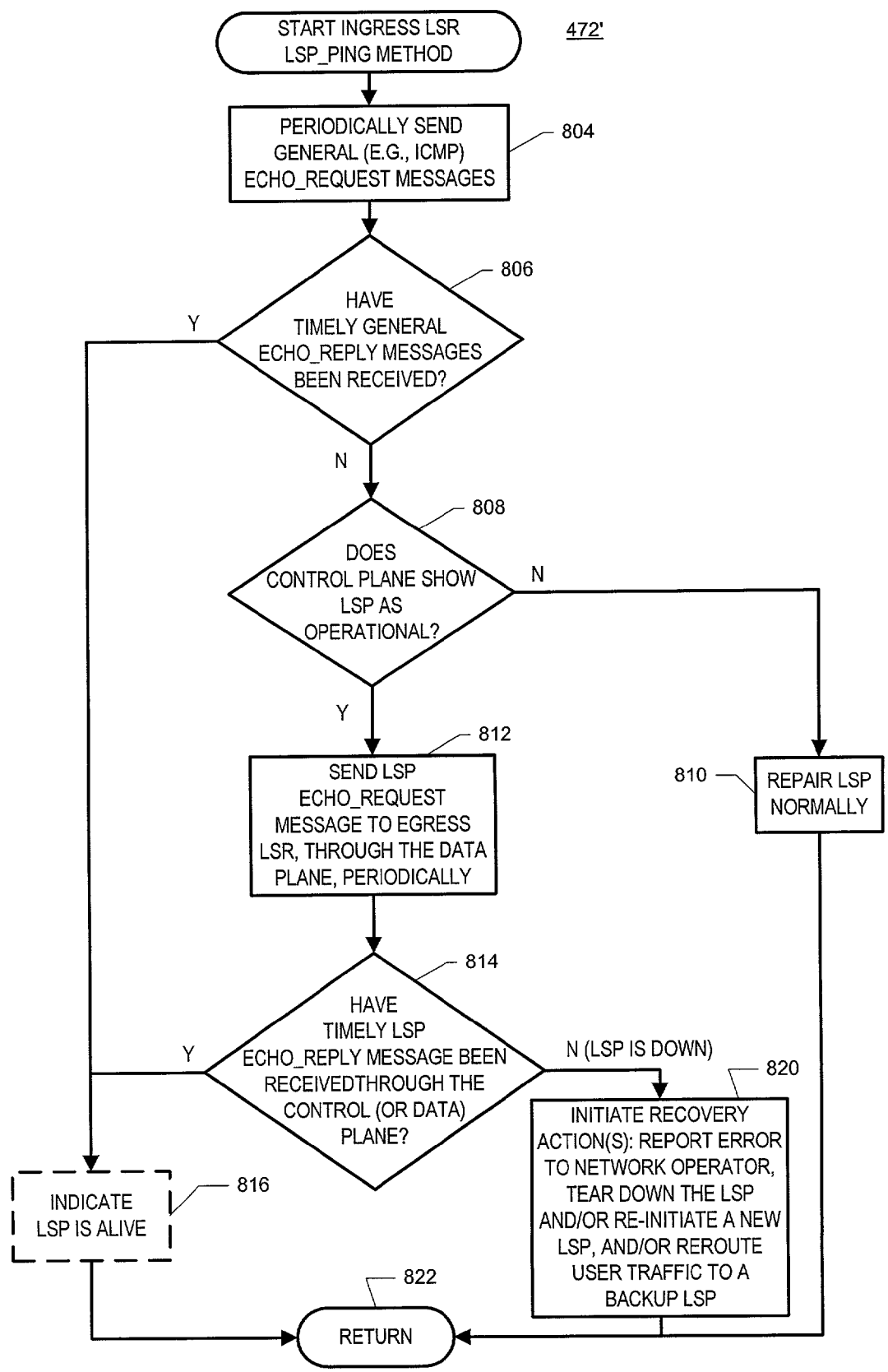
FIG. 8 is a flow diagram of an exemplary method, which may be performed by an ingress LSR of an LSP, for diagnosing a suspect LSP.

FIG. 8 is a flow diagram of an exemplary method 472' for effecting ingress LSR LSP_ping operations 472. As indicated by block 804, an ingress LSR begins to periodically send general (e.g., ICMP) echo request messages downstream through an LSP to an egress LSR.

Ingress LSR LSP_ping method 472' proceeds to decision block 806. If timely general (e.g., ICMP) echo reply messages are received from the egress LSR, ingress LSR LSP_ping method 472' infers that the LSP is alive, as indicated in block 816. The method 472' is then left via RETURN node 822.

Referring back to decision block 806, if timely general (e.g., ICMP) echo reply messages are not received from the egress LSR, ingress LSR LSP_ping method 472' proceeds to decision block 808. In decision block 808, the control plane is checked to see if it shows the LSP to be operational. If the control plane shows that the LSP is not operational, method 472' proceeds to block 810, where the LSP is repaired normally by repair operations in the control plane before the method 472' is left via RETURN node 822.

Referring back to decision block 808, if the control plane shows that the LSP is still alive, the ingress LSR LSP_ping method 472' proceeds to block 812. As indicated by block 812, the ingress LSR periodically sends LSP echo request messages to the egress LSR, through the data plane of the LSP. Ingress LSR LSP_ping method 472' then proceeds to decision block 814. If timely LSP echo reply messages are received in path signaling refresh messages (e.g., RESV refresh messages) through the control plane (or alternatively, via the data plane), it may be assumed that the LSP is alive, as indicated by block 816. The method 472' is then left via RETURN node 822.

Returning to decision block 814, if timely LSP echo_reply messages are not received in path signaling refresh messages (e.g., RESV refresh messages) through the control plane (or alternatively, via the data plane), it may be assumed that the LSP is down, and the ingress LSR LSP_ping method 472' proceeds to block 820.

As indicated by block 820, one or more LSP recovery operations may be initiated. Such recovery operation(s) may include reporting the error to a network operator, tearing down and rebuilding the LSP, and/or rerouting the user traffic through a back-up LSP. Then the ingress LSR LSP_ping method 472' is left via RETURN node 822.

§ 4.4.1.3 Egress LSR LSP_Ping Method

Figure 9:
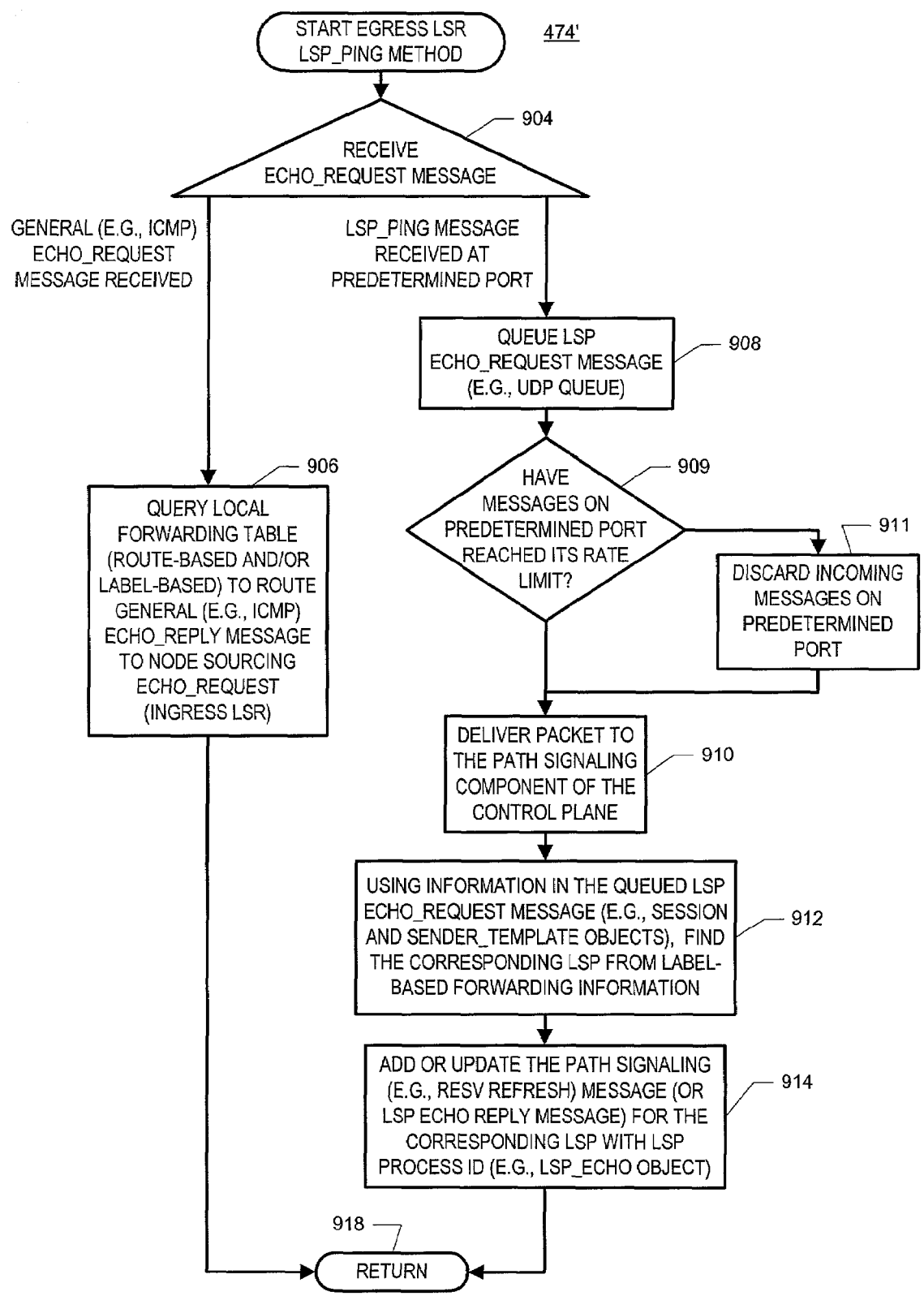
FIG. 9 is a flow diagram of an exemplary method, which may be performed by an egress LSR of an LSP, for diagnosing a suspect LSP.

FIG. 9 is a flow diagram of an exemplary method 474' for effecting egress LSR LSP_ping operations 474. The exemplary egress LSR LSP_ping method 474' begins when trigger event 904 occurs. Trigger events may include the receipt of a general echo request message, and the receipt of an LSP_ping message (at a predetermined port). If a general (e.g., ICMP) echo request message is received, the method 474' proceeds to block 906.

As indicated by block 906, the egress LSR queries a local forwarding table for route-based and/or label-based routing information to route a general (e.g., ICMP) echo reply message to the node that sourced the echo request message. In various embodiments, the execution of this step may be preformed by the hardware of the egress LSR, thereby minimizing the impact of any processing on the control plane of the LSP. The method 474' is then left via RETURN node 918.

Returning to block 904, if an LSP_ping message is received by the egress LSR, the method 474' proceeds to block 908. As mentioned earlier, the LSP_ping message is encapsulated in a protocol, (e.g., UDP) which assigns a predetermined port number to LSP_ping messages. As indicated by block 908, the LSP_ping message is queued according to the protocol in which it is encapsulated. Then method 474' proceeds to decision block 909.

To protect against DoS attacks, a rate limiter may be applied to the predetermined port number. Therefore at decision block 909, if the predetermined port number has reached its incoming rate limit, any LSP_ping message received beyond the rate limit is discarded as indicated by block 911. Method 474' then proceeds to block 910.

Returning to decision block 909, if the LSP_ping messages arriving on the predetermined port have not reached their limit, method 474' proceeds to block 910 directly.

As indicated by block 910, in one embodiment of the present invention the packet is delivered to the path signaling component of the control plane. Then, as indicated by block 912, information included in the LSP echo request message (e.g., session and sender template objects) is used to find the corresponding LSP from the label-based forwarding information of the egress LSR. Further as indicated by block 914, the path signaling (e.g., RESV) refresh message belonging to the corresponding LSP is updated to include the LSP probe process identifier (e.g., LSP_echo object), which was included in the LSP echo_request message. If an identical LSP probe process identifier (e.g., LSP_echo object) already exists, the new LSP probe process identifier (e.g., LSP_echo object) is discarded. The method 474' is then left via RETURN node 918.

Although not shown, the egress LSR allows the path signaling operation to send the path signaling (e.g., RESV) refresh message as it would normally do. However, as indicated in block 914, such a path signaling refresh message may include the LSP_echo object.

In an alternative embodiment, the data plane (e.g., another LSP) is used to carry LSP echo_reply messages from the egress LSR to the ingress LSR, instead of the steps shown in blocks 910, 912, 914.

§ 4.4.1.4 Intermediate LSR LSP_Ping Method

Figure 10:
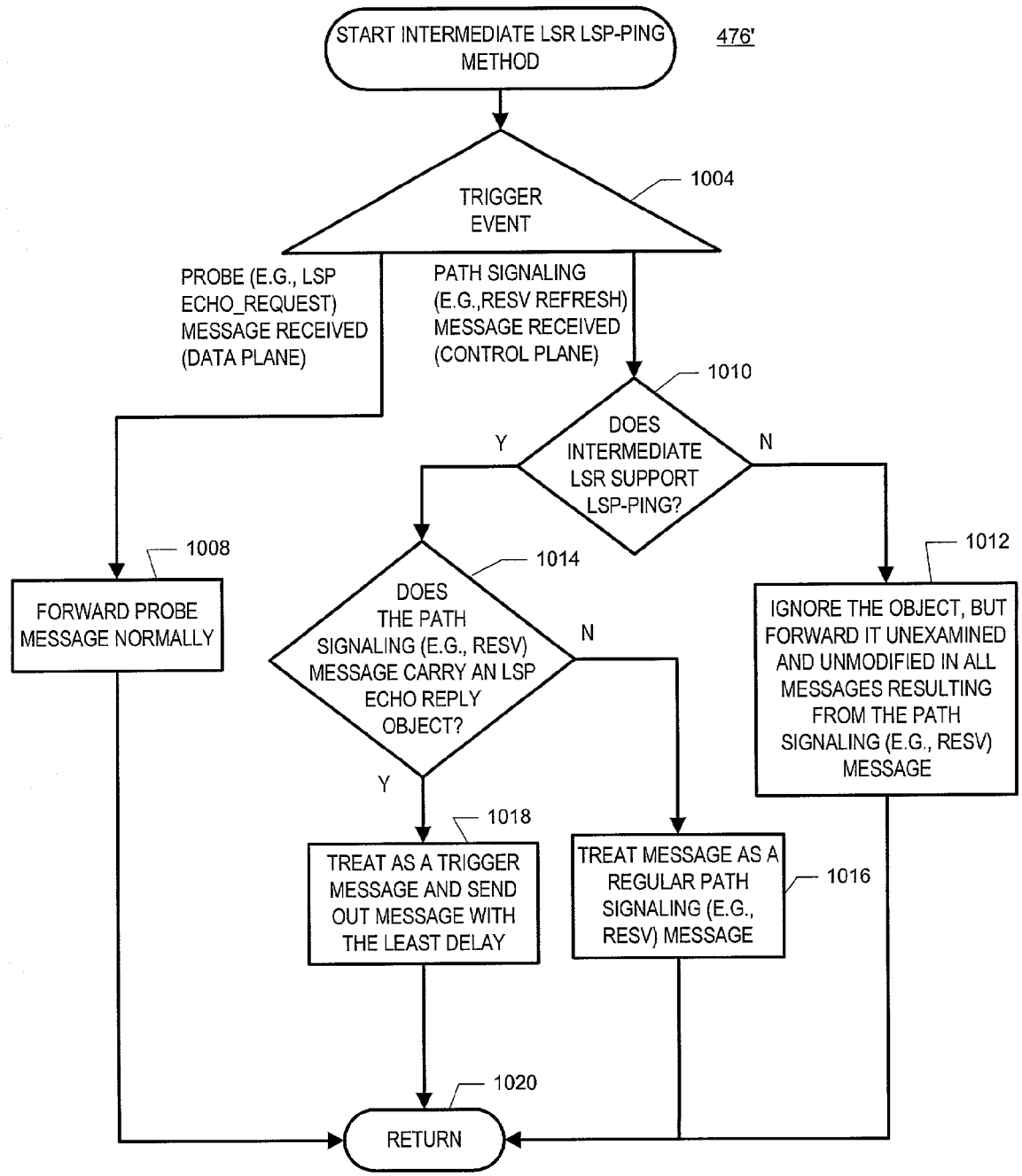
FIG. 10 is a flow diagram of an exemplary method, which may be performed by an intermediate LSR of an LSP, for diagnosing a suspect LSP.

FIG. 10 is a high-level flow diagram of an exemplary method 476' for effecting intermediate LSR LSP_ping operations 476. Exemplary intermediate LSR LSP_ping method 476' begins when trigger event 1004 occurs. Trigger events may include the receipt of a diagnostic probe (e.g., a general echo_request message, or an LSP_ping message) and the receipt of a path signaling message (e.g., RESV message). If a diagnostic probe is received (on the data plane), the method 476' proceeds to block 1008.

As indicated by block 1008, the intermediate LSR forwards the probe message normally switching the IN label with the appropriate OUT label, because it was sent through an LSP by an ingress LSR. An intermediate LSR usually does not inspect the contents of a packet traveling through an LSP. After the message is forwarded, the intermediate LSR LSP_ping method 476' is left via RETURN node 1020.

Returning to trigger event 1004, if a path signaling message (e.g., a RESV refresh message) is received on the control plane, the intermediate LSR LSP_ping method 476' proceeds to decision block 1010.

At decision block 1010, if it is determined that the intermediate LSR does not support LSP_ping messages, method 476' proceeds to block 1012. As indicated by block 1012, the LSP_object is ignored and forwarded unexamined and unmodified. In addition, messages resulting from that path signaling message will also include the LSP_object and be forwarded unexamined and unmodified. Then, the intermediate LSR LSP_ping method 476' is left via RETURN node 1020.

Referring back to decision block 1010, if it is determined that the intermediate LSR does support LSP_ping messages, the method 476' proceeds to decision block 1014.

At decision block 1014, if the path signaling, (e.g., RESV) message does not carry an LSP echo reply object, the method 476' proceeds to step 1016, and treats the path signaling message like a regular message. Then, intermediate LSR LSP_ping method 476' is left via RETURN node 1020.

Referring back to decision block 1014, if the path signaling message carries an LSP_echo object, method 476' proceeds to block 1018. As indicated by block 1018, the message is treated as a trigger message and it is forwarded with the least amount of delay. Trigger messages are RSVP messages that advertise new state and/or any other information not present in earlier transmissions. Trigger messages may include messages advertising a new state, a route change that alters a reserved path, or a modification to an existing RSVP session or reservation. Since the information in a trigger message may be vital in maintaining the continuity of an LSP, these messages are forwarded with the least amount of delay. After the trigger message is forwarded, the intermediate LSR LSP_ping method 476' is left via RETURN node 1020.

§4.4.1.5 Alternative LSP_Ping Method

As described above, the data plane may be used to carry an LSP echo_reply to the ingress LSR. For example, if the label distribution protocol ("LDP") is used to generate and control the LSP being checked, the LSP echo_reply (or replies) may be sent back to the source (ingress) LSR via the data plane, rather than via the control plane. Such LSP echo_reply (replies) may be in the ICMP format.

§ 4.4.2 Exemplary LSP_Ping Message

Figure 6:
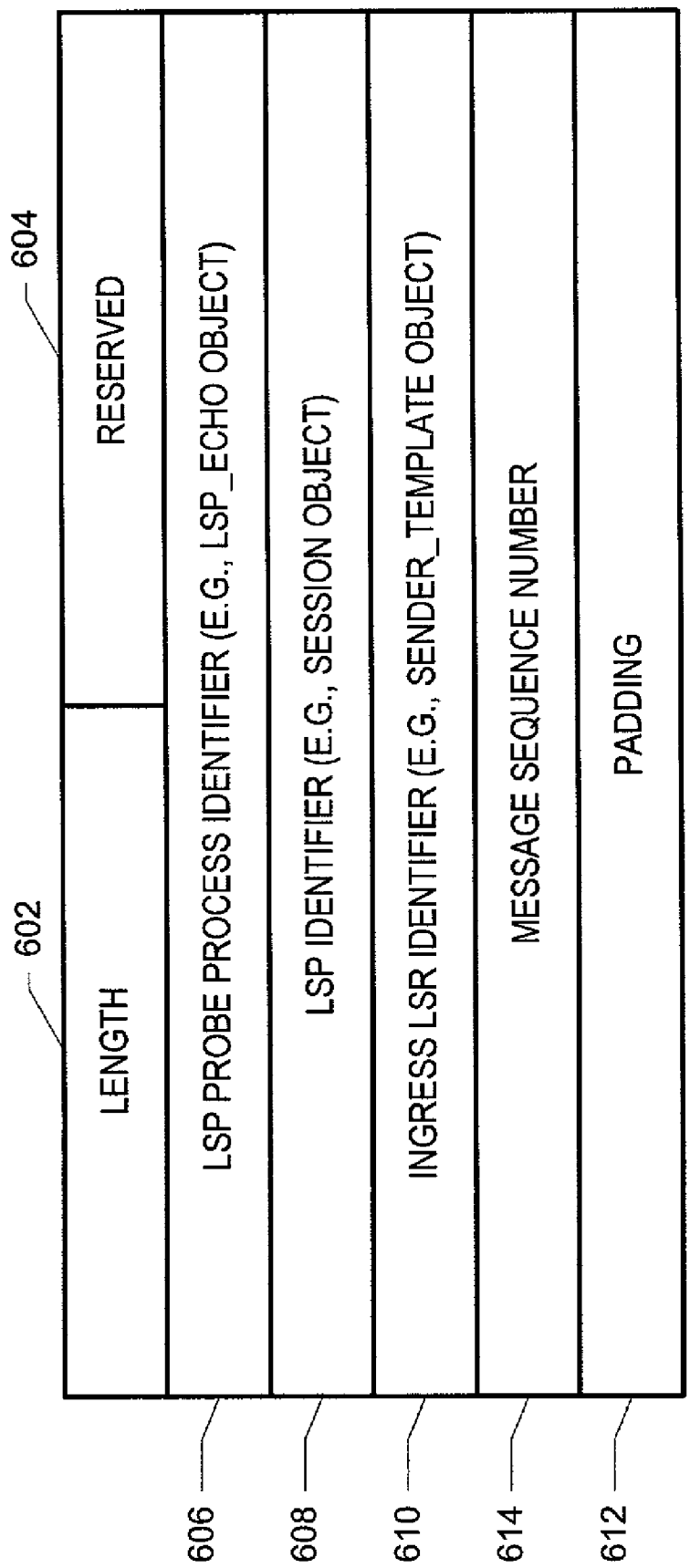
FIG. 6 is a block diagram illustrating the data structure of an exemplary LSP echo_request probe.

FIG. 6 is an exemplary data structure 600 for effecting an LSP_ping message. The LSP_ping message may be encapsulated in a protocol that allows flow control (e.g., UDP) to protect against DoS attacks.

LSP_ping message 600 may include a first field 602 that announces the length of the message. LSP_ping message 600 may also include a second field 604 that is reserved, e.g., for future use. A third field 606 includes an LSP probe process identifier (e.g., an LSP_echo object), a fourth field includes an LSP identifier(s), a fifth field includes an ingress LSR identifier, a sixth field includes padding and an optional seventh field includes a sequence number. (Each of the fields, three to seven, are described below.)

The LSP probe process identifier (e.g., LSP_echo object) 606 includes a source identifier. This source identifier uniquely identifies the suspect LSP, thereby allowing the ingress LSR to distinguish returned responses, in the case where multiple LSPs are being tested. For example in RSVP-TE, the form of the LSP_echo object may be 11bbbbbb, and the C-Type of the message may equal 1.

The LSP identifier 608, and the ingress LSR identifier 610 may be used by the egress LSR to identify which path signaling (e.g., RESV) refresh message it should insert the LSP probe process identifier (e.g., LSP_echo object) into (in the embodiment using the control plane for LSP echo_replies).

The padding 612 may be used as follows. The LSP_ping message can be used to test an advertised Maximum Transmission Unit (MTU) through an LSP. The advertised MTU is the largest packet that can be delivered through an LSP before fragmentation of the packet may be required. This is done by padding the LSP_ping message until it is the size of the advertised MTU, and sending the LSP_ping message through the LSP. If the LSP_echo object is returned with a subsequent path signaling (e.g., RESV) refresh message, then the sourcing LSR may infer that the LSP can transmit packets at the advertised MTU size.

A message sequence number 614 may also be provided. This sequence number can be used to distinguish messages when a given LSP probe process generates multiple LSP probe packets.

§ 4.4.3 Exemplary Apparatus

Figure 1:
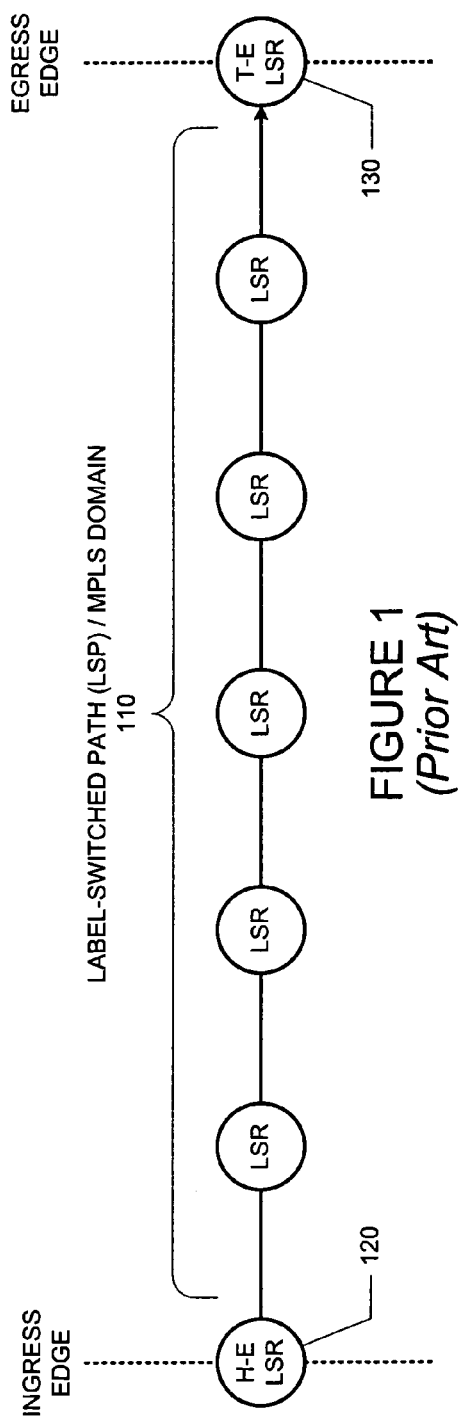
FIG. 1 illustrates an LSP including a head-end (or ingress) LSR, an intermediate LSR, and a tail-end (or egress) LSR.
Figure 2:
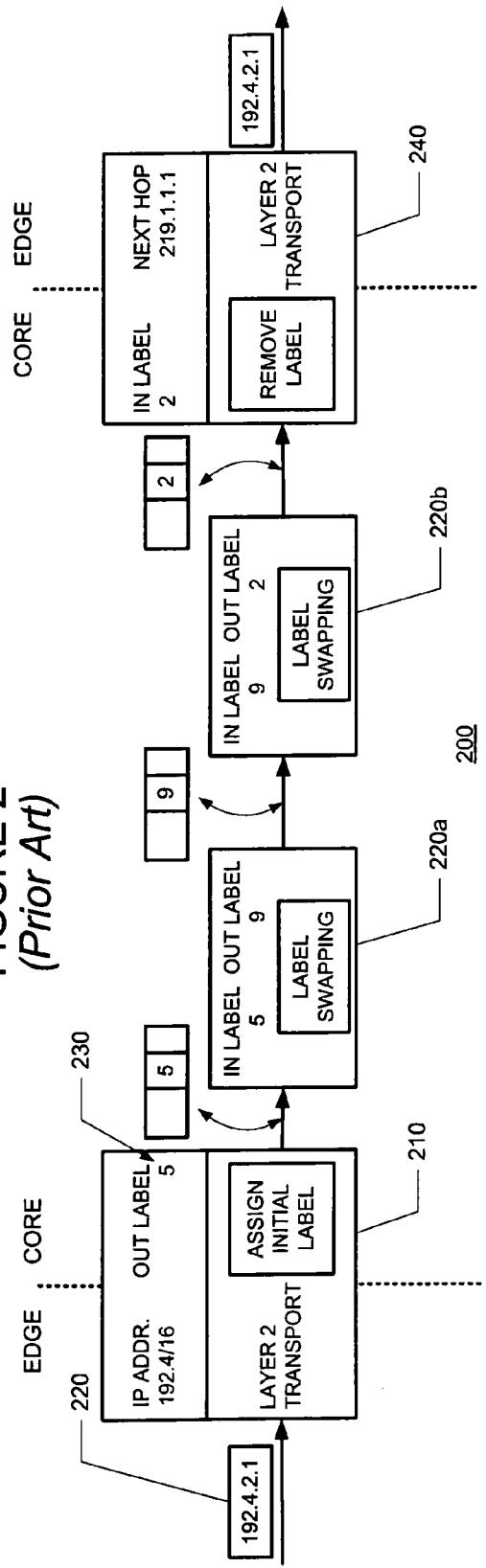
FIG. 2 illustrates label assignment, switching and popping by label-switching routers of a label-switched path.
Figure 3:
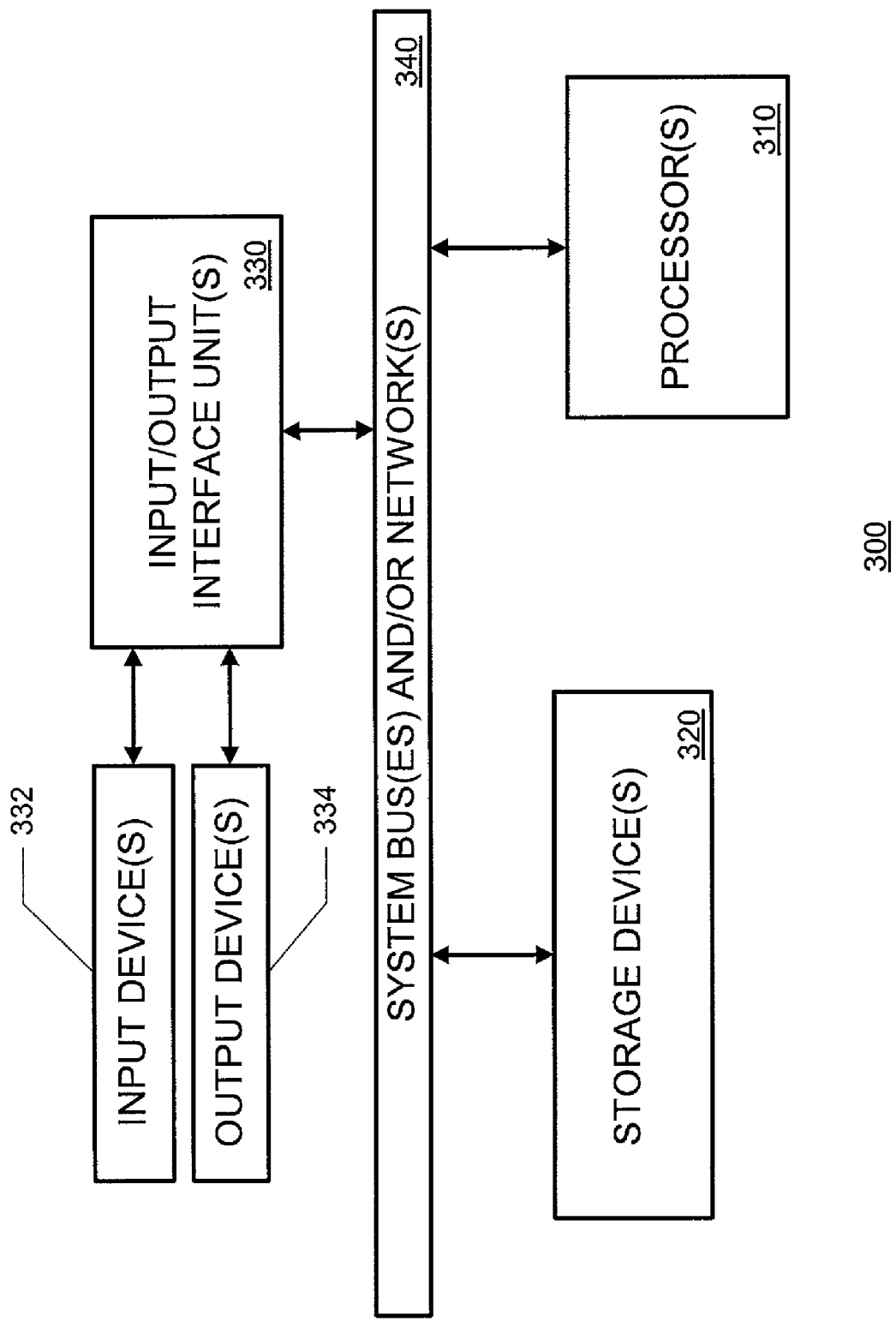
FIG. 3 is a block diagram of an apparatus that may be used to effect at least some aspects of the present invention.

FIG. 3 is high-level block diagram of a machine 300 which may effect one or more of the operations discussed above. The machine 300 basically includes a processor(s) 310, an input/output interface unit(s) 330, a storage device(s) 320, and a system bus(es) and/or a network(s) 340 for facilitating the communication of information among the coupled elements. An input device(s) 332 and an output device(s) 334 may be coupled with the input/output interface(s) 330. Operations of the present invention may be effected by the processor(s) 310 executing instructions. The instructions may be stored in the storage device(s) 320 and/or received via the input/output interface(s) 330. The instructions may be functionally grouped into processing modules.

The machine 300 may be a router or a label-switching router for example. In an exemplary router, the processor(s) 310 may include a microprocessor, a network processor, and/or (e.g., custom) integrated circuit(s). In the exemplary router, the storage device(s) 320 may include ROM, RAM, SDRAM, SRAM, SSRAM, DRAM, flash drive(s), hard disk drive(s), and/or flash cards. At least some of these storage device(s) 320 may include program instructions defining an operating system, a protocol daemon, and/or other daemons. In a preferred embodiment, the methods of the present invention may be effected by a microprocessor executing stored program instructions (e.g., defining a part of the protocol daemon). At least a portion of the machine executable instructions may be stored (temporarily or more permanently) on the storage device(s) 320 and/or may be received from an external source via an input interface unit 330. Finally, in the exemplary router, the input/output interface unit(s) 330, input device(s) 332 and output device(s) 334 may include interfaces to terminate communications links.

Naturally, the operations of the present invention may be effected on systems other than routers. Such other systems may employ different hardware and/or software.

§ 4.5 AN EXAMPLE ILLUSTRATING OPERATIONS OF AN EXEMPLARY EMBODIMENT

Figure 11:
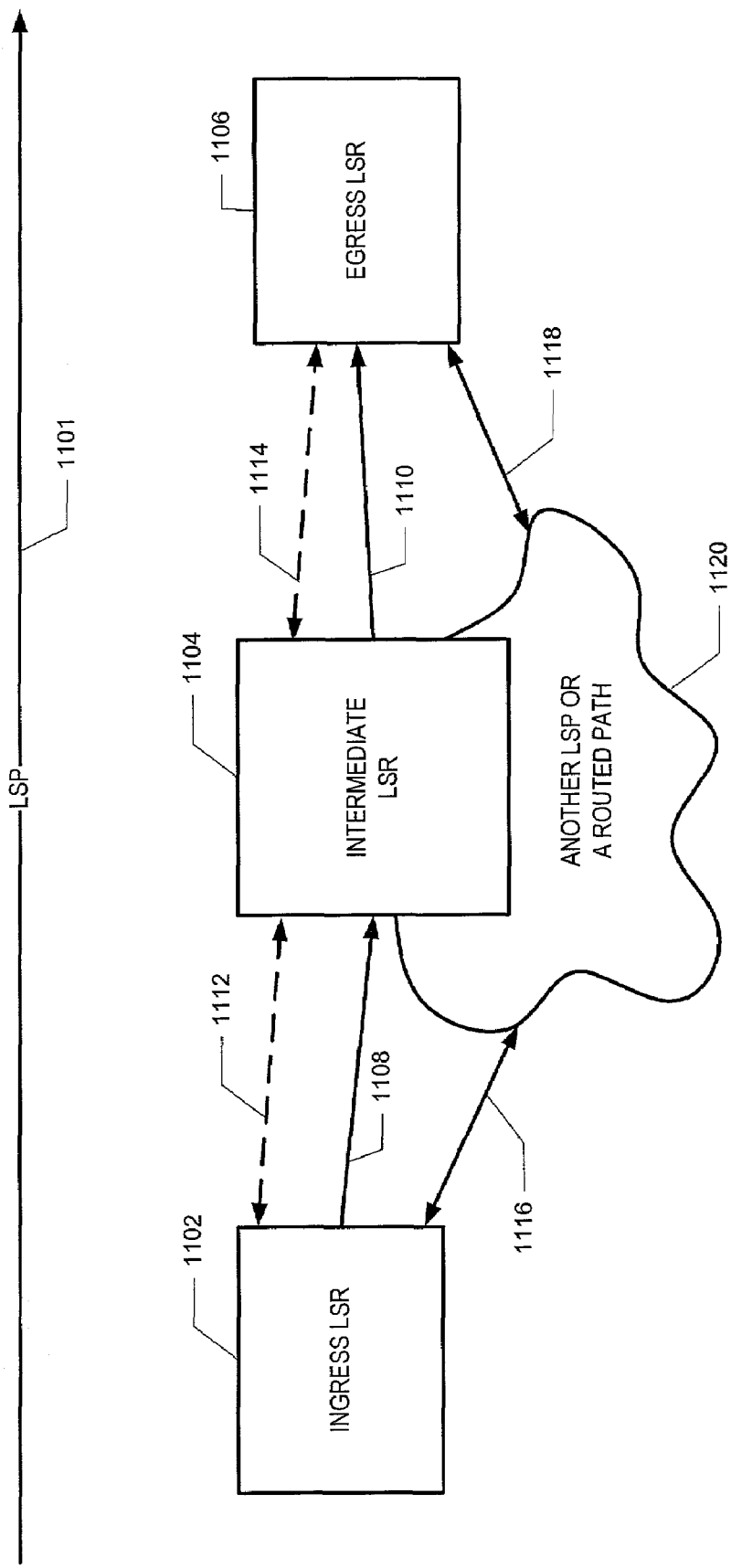
FIG. 11 is a block diagram illustrating an exemplary communication system in which a diagnostic operation is performed.

The following is an example illustrating the diagnostic operation 470 in an exemplary embodiment of the present invention. FIG. 11 is a high-level diagram illustrating communications system 1100 in which diagnostic operation 470 may be performed. Communications system 1100 includes LSP 1101, ingress LSR 1102, intermediate LSR 1104, egress LSR 1106, and other network elements 1120 capable of forwarding data. Dashed arrows 1112, 1114 represent control plane communications pertaining to LSP 1101, and solid arrows 1108, 1110 represent data plane communications that can occur over LSP 1101. Solid arrows 1116, 1118 represent other network connections the LSRs 1102, 1104, 1106 may have.

In this example RSVP is used to establish LSP 1101, Internet Control Message Protocol (ICMP) is used for the general echo_request operation of the first stage of the invention, and LSP_ping messaging is used for the second stage of the present invention. Therefore LSRs 1102, 1106 should support IP-based routing and LSP_ping messages.

This example begins when ingress router 1102 suspects that there is a problem with LSP 1101, but the control plane messages indicate that the LSP as alive. Ingress router 1102 starts the first stage of diagnostic operation 470 and proceeds to periodically send ICMP echo_request messages downstream over the LSP's 1101 data plane 1108, 1110. The egress router receives the ICMP echo request_messages and sends ICMP echo_reply messages upstream to the ingress LSR that sourced the request messages (through another LSP or routed path 1120). In this example, assume that ICMP echo-reply messages are not being received by the ingress LSR 1102 for a predetermined time interval (There is a failure in the LSP 1108, 1110, the reverse path 1120, or both.). To determine if the LSP 1101 is the problem, the ingress LSR 1102 initiates stage 2 of the diagnostic operation 470.

In stage 2 of the diagnostic operation 470, the ingress LSR 1102 periodically sends LSP_ping messages, encapsulated in UDP, to the egress LSR 1106 through the LSP's 1101 data plane 1108, 1110. When the egress LSR 1106 receives the UDP packet, it recognizes it as an LSP_ping message because of it being received at a predetermined port number.

At the egress LSR 1106, the LSP_ping message is passed to the control plane. Using information included in the LSP_ping message, the control plane locates the corresponding RESV message for the LSP in its 1106 label-based forwarding information. The RESV message may already contain an identical or similar LSP_echo object from an earlier LSP_ping message. Therefore, the control plane checks the RESV message for an identical or similar LSP_echo object, and if an identical or similar LSP_echo object is present in the RESV message, nothing happens. If not, the egress LSR 1106 adds or updates the LSP_echo object and refreshes the RESV message.

When it is time to refresh LSP 1101 the RESV message including the LSP_echo object is sent back to ingress LSR 1102 on the control plane 1114, 1112. At intermediate LSR 1104, the RESV message is classified as a trigger message and is delivered upstream as soon as possible. As mentioned earlier, trigger messages are RSVP messages that advertise new state and/or any other information not present earlier transmissions.

When the ingress router receives the RESV message, it also receives the LSP_echo object. It compares the received object to the original object that was transmitted, and if they are the same, ingress LSR infers that LSP 1101 is alive.

§ 4.6 CONCLUSIONS

As can be appreciated from the foregoing disclosure, the present invention discloses apparatus, data structures and methods for testing the liveliness of a data plane of a label switched path (LSP). A two stage approach is used to minimize the processing overhead imposed on an LSR control plane. The first stage uses a general echo request operation that may be implemented using hardware. Therefore, the first stage does not heavily burden the control plane of the LSR. If a suspect LSP passes the first stage of the diagnostic operation, nothing more is done, but if the suspect LSP fails the first stage, the diagnostic operation proceeds to a second stage.

The second stage of the diagnostic operation sends probing messages through the suspect LSP, but uses the control plane (or alternatively, the data plane) to deliver the acknowledging messages. If the suspect LSP fails the second stage of the diagnostic operation, the ingress LSR can infer that the LSP is down, and begin recovery actions.

The present invention can also be used to test MTU limits. In addition, the LSP_ping message of the present invention is encapsulated in a protocol that allows flow control, thereby protecting an LSR that can receive LSP_ping messages from DoS attacks.

What is claimed is:

1. A method for testing a label switched path, the method comprising:

a) performing a first test including testing a data plane from an ingress node of the label switched path to an egress node of the label switch path, over the label switched path, together with a data plane from the egress node of the label switched path back to the ingress node of the label switch path;

b) determining whether or not the first test was passed;

c) if it is determined that the first test was not passed, and if a control plane of the label switched path is alive, then performing a second test including testing the data plane from the ingress node of the label switched path to the egress node of the label switch path, over the label switched path, together with the control plane from the egress node of the label switched path back to the ingress node of the label switch path, wherein if the second test was not passed, then indicating that the data plane of the label switched path is down.

2. The method of claim 1 further comprising:

d) if it is indicated that the data plane of the label switched path is down, then reporting an error in the label switched path.

3. The method of claim 1 further comprising:

d) if it is indicated that the data plane of the label switched path is down, then using an alternative label switched path from the ingress node to the egress node for forwarding data.

4. The method of claim 1 further comprising:

d) if it is indicated that the data plane of the label switched path is down, then tearing down the label switched path.

5. The method of claim 4 further comprising:

e) generating a new label switched path from the ingress node to the egress node.

6. The method of claim 1 wherein the act of performing a first test includes i) providing, at the ingress node, a general echo request message, addressed to the egress node over the label switched path, and ii) determining, at the ingress node, whether a general echo reply message is received within a predetermined time, wherein if the general echo reply message is not received within the predetermined time, the first test is not passed.

7. The method of claim 1 wherein the act of performing a second test includes i) providing, at the ingress node, a label switched path probe message;

ii) sending the label switched path probe message to the egress node over the label switched path;

iii) if the label switched path probe message is received at the egress node, then A) generating a probe reply message at the egress node, and B) sending the probe reply message from the egress node toward the ingress node over the control plane, wherein if the probe reply message is not received by the ingress node within a predetermined time, the second test is not passed.

8. The method of claim 7 wherein the label switched path probe message includes a first value identifying the ingress node, a second value identifying the label switched path being tested, and a third value identifying the second test.

9. The method of claim 8 wherein the probe reply message includes a value based on the third value.

10. The method of claim 8 wherein the probe reply message includes the third value.

11. The method of claim 8 wherein the probe reply message is included in a resource reservation protocol RESV message.

12. The method of claim 7 wherein the label switched path probe message is padded such that its length corresponds to the length of a maximum transmission unit associated with the label switched path.

13. The method of claim 7 wherein the label switched path probe message is encapsulated in a user datagram protocol packet.

14. The method of claim 7 wherein the label switched path probe message is provided in accordance with a rate limiting protocol.

15. A node for use in a network as a part of a label switched path, the node comprising:

a) a forwarding component for forwarding data based on forwarding information, the forwarding component defining a part of a data plane; and b) a control component for maintaining the forwarding information, the control component defining a part of a control plane, and including diagnostic facilities adapted to i) perform at least a part of a first test including testing the data plane from an ingress node of the label switched path to an egress node of the label switch path, over the label switched path, together with the data plane from the egress node of the label switched path back to the ingress node of the label switch path;

ii) determine whether or not the first test was passed;

iii) perform at least a part of a second test including testing the data plane from the ingress node of the label switched path to the egress node of the label switch path, over the label switched path, together with the control plane from the egress node of the label switched path back to the ingress node of the label switch path, if it is determined that the first test was not passed, and if a control plane of the label switched path is alive, and iv) indicating that the data plane of the label switched path is down if the second test was not passed.

16. The node of claim 15 wherein the diagnostic facility is further adapted to report an error in the label switched path if it is indicated that the data plane of the label switched path is down.

17. The node of claim 15 wherein the control component includes a microprocessor executing program instructions, and wherein the first test has a minimal impact on microprocessor.

18. A method for testing a label switched path, for use by an ingress node of the label switched path, the method comprising:

a) performing a part of a first test by i) sending a general echo request message to an egress node of the label switched path, ii) waiting a first predetermined time for a reply to the general echo request message, wherein if a reply to the general echo request message is received within the predetermined time, then the first test is passed, and wherein if a reply to the general echo request is not received within the predetermined time, then the first test is not passed;

b) if it is determined that the first test was not passed, and if a control plane of the label switched path is alive, then performing a part of a second test by i) sending a label switched path probe message to the egress node of the label switched path, ii) waiting a second predetermined time for a control plane message indicating that the egress node received the label switched path probe message, wherein if a control plane message indicating that the egress node received the label switched path probe message is received within the second predetermined time, then a data plane of the label switched path is considered alive, and wherein if a control plane message indicating that the egress node received the label switched path probe message is not received within the second predetermined time, then a data plane of the label switched path is considered down.

19. The method of claim 18 further comprising:
d) if the data plane of the label switched path is considered down, then reporting an error in the label switched path.

20. The method of claim 18 further comprising:
d) if the data plane of the label switched path is considered down, then using an alternative label switched path from the ingress node to the egress node for forwarding data.

21. The method of claim 18 further comprising:
d) if the data plane of the label switched path is considered down, then tearing down the label switched path.

22. The method of claim 21 further comprising:
e) generating a new label switched path from the ingress node to the egress node.

23. The method of claim 18 wherein the label switched path probe message includes
a first value identifying the ingress node,
a second value identifying the label switched path being tested, and
a third value identifying the second test.

24. The method of claim 23 wherein the probe reply message includes a value based on the third value.

25. The method of claim 23 wherein the probe reply message includes the third value.

26. The method of claim 18 wherein the probe reply message is included in a resource reservation protocol RESV message.

27. The method of claim 18 wherein the label switched path probe message is padded such that its length corresponds to the length of a maximum transmission unit associated with the label switched path.

28. The method of claim 18 wherein the label switched path probe message is encapsulated in a user datagram protocol packet.

29. The method of claim 19 wherein the label switched path probe message is provided in accordance with a rate limiting protocol.

30. For use in a label switched path, a node defining the ingress of the label switched path, the node comprising:
a) a forwarding component for forwarding data based on forwarding information, the forwarding component defining a part of a data plane; and
b) a control component for maintaining the forwarding information, the control component defining a part of a control plane, and including diagnostic facilities adapted to
i) perform a part of a first test by
A) sending a general echo request to an egress node of the label switched path,
B) waiting a first predetermined time for a reply to the general echo request message, wherein if a reply to the general echo request message is received within the predetermined time, then the first test is passed, and wherein if a reply to the general echo request message is not received within the predetermined time, then the first test is not passed;
ii) if it is determined that the first test was not passed, and if a control plane of the label switched path is alive, then perform a part of a second test by
A) sending a label switched path probe message to the egress node of the label switched path,
B) waiting a second predetermined time for a control plane message indicating that the egress node received the label switched path probe message, wherein if a control plane message indicating that the egress node received the label switched path probe message is received within the second predetermined time, then a data plane of the label switched path is considered alive, and wherein if a control plane message indicating that the egress node received the label switched path probe message is not received within the second predetermined time, then a data plane of the label switched path is considered down.

31. The node of claim 30 wherein the label switched path probe message includes
a first value identifying the ingress node,
a second value identifying the label switched path being tested, and
a third value identifying the second test.

32. A method for testing a label switched path, for use by an egress node of the label switched path, the method comprising:
a) performing a part of a first test by
i) accepting a general echo request message, and
ii) replying to the accepted general echo request message;
b) performing a part of a second test by
i) accepting a label switched path probe message which includes a value identifying the second test, and
ii) sending a control plane message towards the ingress node of the label switched path, wherein the control plane message includes the value identifying the second test.

33. The method of claim 32 wherein the label switched path probe message further includes a second value identifying a node that sourced the label switched path probe message, and a third value identifying the label switched path, and
wherein the control plane message is associated with the second test identified by the third value.

34. The method of claim 32 wherein the control plane message is a trigger message.

35. The method of claim 32 wherein the control plane message is a resource reservation protocol RESV message.

36. For use in a label switched path, a node defining the egress of the label switched path, the node comprising:
a) a forwarding component for forwarding data based on forwarding information, the forwarding component defining a part of a data plane; and
b) a control component for maintaining the forwarding information, the control component defining a part of a control plane, and including diagnostic facilities adapted to
i) perform a part of a first test by
A) accepting a general echo request message, and
B) replying to the accepted general echo request message;

ii) perform a part of a second test by
A) accepting a label switched path probe message which includes a value identifying the second test, and
B) sending a control plane message towards the ingress node of the label switched path, wherein the control plane message includes the value identifying the second test.

37. The node of claim 36 wherein the label switched path probe message further includes a second value identifying a node that sourced the label switched path probe message, and a third value identifying the label switched path, and
wherein the control plane message is associated with the label switched path identified by the third value.

38. The node of claim 36 wherein the control plane message is a trigger message.

39. The node of claim 36 wherein the control plane message is a resource reservation protocol RESV message.

40. A computer-readable medium storing a computer-readable message used for testing a data plane of a label switched path, the computer-readable message comprising:
a) a first value from which the label switched path can be inferred; b) a second value from which an ingress node of the label switched path can be inferred; c) a third value identifying the message; and d) padding, wherein the padding is chosen such that a total length of the message corresponds to a maximum transmission unit associated with the label switched path, wherein the message, when interpreted by a processor executing stored program instructions, facilitates the testing of the data plane of the label switched path.

41. The computer-readable medium of claim 40 wherein the computer-readable message is a resource reservation protocol RESV message including a value identifying a second test with which the reply message is associated.

42. A computer-readable medium storing computer-executable instructions which, when executed by a computer, effect the method of claim 18.

43. A computer-readable medium storing computer-executable instructions which, when executed by a computer, effect the method of claim 32.

44. A method for testing a label switched path, the method comprising:
a) performing a first test including testing a data plane from an ingress node of the label switched path to an egress node of the label switch path, over the label switched path, together with a data plane from the egress node of the label switched path back to the ingress node of the label switch path;
b) determining whether or not the first test was passed;
c) if it is determined that the first test was not passed, and if a control plane of the label switched path is alive, then performing a second test including testing the data plane from the ingress node of the label switched path to the egress node of the label switch path, over the label switched path, together with a data plane from the egress node of the label switched path back to the ingress node of the label switch path,
wherein if the second test was not passed, then indicating that the data plane of the label switched path is down.

45. A node for use in a network as a part of a label switched path, the node comprising:
a) a forwarding component for forwarding data based on forwarding information, the forwarding component defining a part of a data plane; and
b) a control component for maintaining the forwarding information, the control component defining a part of a control plane, and including diagnostic facilities adapted to
i) perform at least a part of a first test including testing the data plane from an ingress node of the label switched path to an egress node of the label switch path, over the label switched path, together with the data plane from the egress node of the label switched path back to the ingress node of the label switch path;
ii) determine whether or not the first test was passed;
iii) perform at least a part of a second test including testing the data plane from the ingress node of the label switched path to the egress node of the label switch path, over the label switched path, together with a data plane from the egress node of the label switched path back to the ingress node of the label switch path, if it is determined that the first test was not passed, and if a control plane of the label switched path is alive, and
iv) indicating that the data plane of the label switched path is down if the second test was not passed.

46. A processor-readable storage device storing processor-executable instructions which, when executed by a processor, effect the method of claim 18.

47. A processor-readable storage device storing processor-executable instructions which, when executed by a processor, effect the method of claim 32.

* * * * *